(12) United States Patent
Höjer et al.

(10) Patent No.: US 12,492,972 B2
(45) Date of Patent: Dec. 9, 2025

(54) SAMPLE PREPARATION DEVICE

(71) Applicant: PEXA AB, Gothenburg (SE)

(72) Inventors: Svante Höjer, Kungälv (SE); Jörgen Östling, Hönö (SE)

(73) Assignee: PEXA AB, Gothenburg (SE)

( * ) Notice: Subject to any disclaimer, the term of this patent is extended or adjusted under 35 U.S.C. 154(b) by 0 days.

(21) Appl. No.: 18/555,608

(22) PCT Filed: Apr. 14, 2022

(86) PCT No.: PCT/EP2022/059988
§ 371 (c)(1),
(2) Date: Oct. 16, 2023

(87) PCT Pub. No.: WO2022/223420
PCT Pub. Date: Oct. 27, 2022

(65) Prior Publication Data
US 2024/0210286 A1 Jun. 27, 2024

(30) Foreign Application Priority Data
Apr. 19, 2021 (SE) .................................. 2150486-5

(51) Int. Cl.
*G01N 1/28* (2006.01)
*G01N 1/04* (2006.01)

(52) U.S. Cl.
CPC ............... *G01N 1/286* (2013.01); *G01N 1/04* (2013.01); *G01N 2001/288* (2013.01)

(58) Field of Classification Search
CPC .... A61B 5/411; A61B 5/097; G01N 15/0255; G01N 2015/0261; G01N 33/497;
(Continued)

(56) References Cited

U.S. PATENT DOCUMENTS

2005/0129579 A1 6/2005 Morrison
2006/0046282 A1* 3/2006 Hewitt .................. C40B 60/14
435/405
(Continued)

FOREIGN PATENT DOCUMENTS

EP 2447700 5/2012
WO WO 99/65625 12/1999
(Continued)

OTHER PUBLICATIONS

International Search Report and Written Opinion were mailed on Aug. 8, 2023 by the International Searching Authority for International Application No. PCT/EP2022/059988 filed on Apr. 14, 2022 and published as WO2022223420 (Applicant—Pexa AB) (9 pages).

*Primary Examiner* — Lyle Alexander
*Assistant Examiner* — Tingchen Shi
(74) *Attorney, Agent, or Firm* — Ballard Spahr LLP

(57) ABSTRACT

Described a sample preparation device for preparing a sample containing particles collected onto a collection plate. The sample preparation device includes a holding device for securing the collection plate; a device for punch cutting with a sample collector, and a guiding device that includes two or more guide bores. The guiding device extends a first length along a plane x between first and second transverse sides; The guiding device includes a centerline A extending parallel to plane x dividing the guiding device into equally sized first and second halves. The two or more guide bores are asymmetrically located relative to the centerline A in the first and/or second halves.

15 Claims, 10 Drawing Sheets

(58) Field of Classification Search
CPC .... G01N 1/286; G01N 1/04; G01N 2001/288; G01N 1/28
See application file for complete search history.

(56) References Cited

U.S. PATENT DOCUMENTS

2013/0041256 A1* 2/2013 Fiebig ................ A61B 17/3468
600/432
2019/0110436 A1* 4/2019 Gardner ............... A01K 11/003

FOREIGN PATENT DOCUMENTS

| WO | WO 2009/045163 | 4/2009 |
| WO | WO 2013/044124 | 3/2013 |
| WO | WO 2019/011750 | 1/2019 |

* cited by examiner

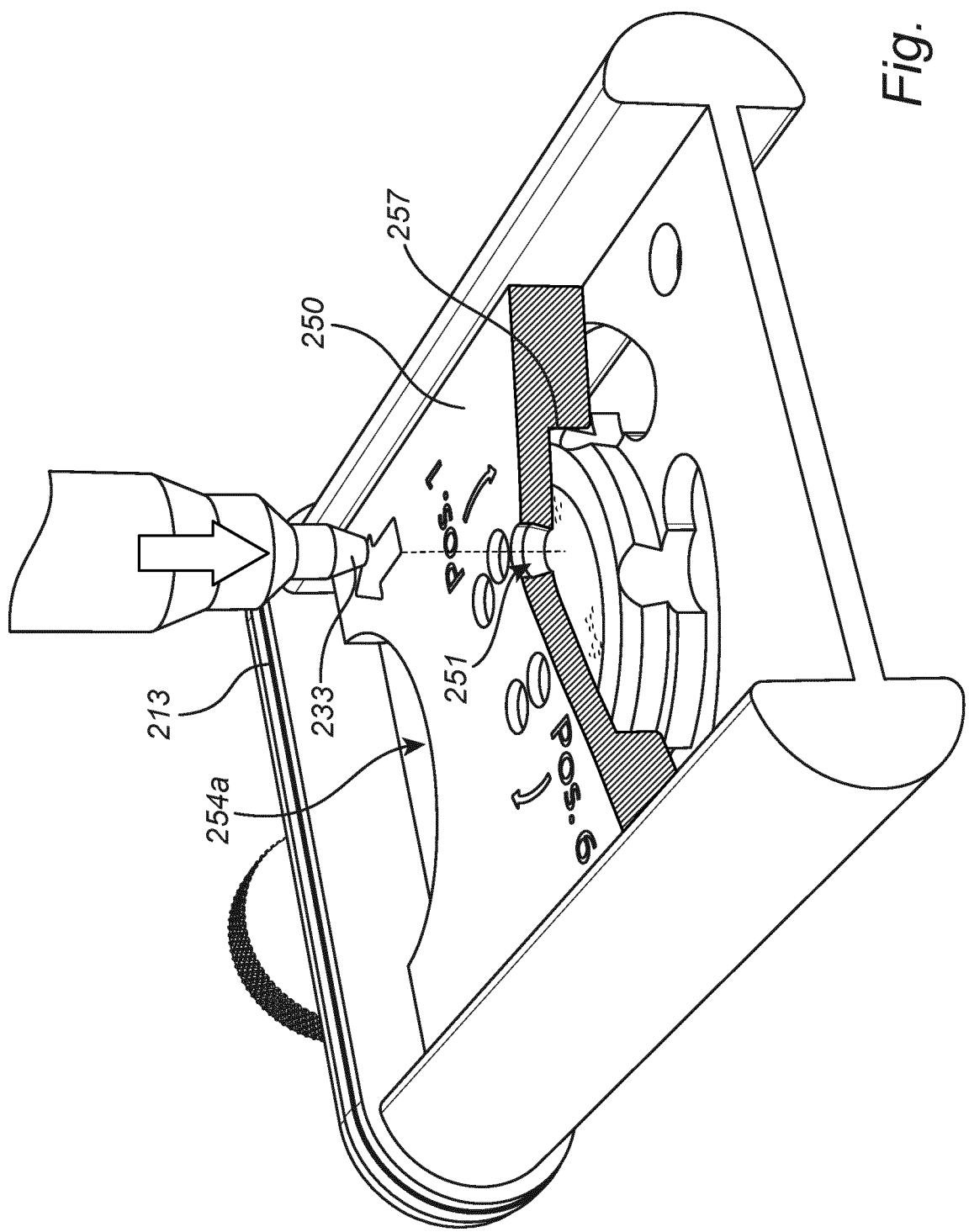

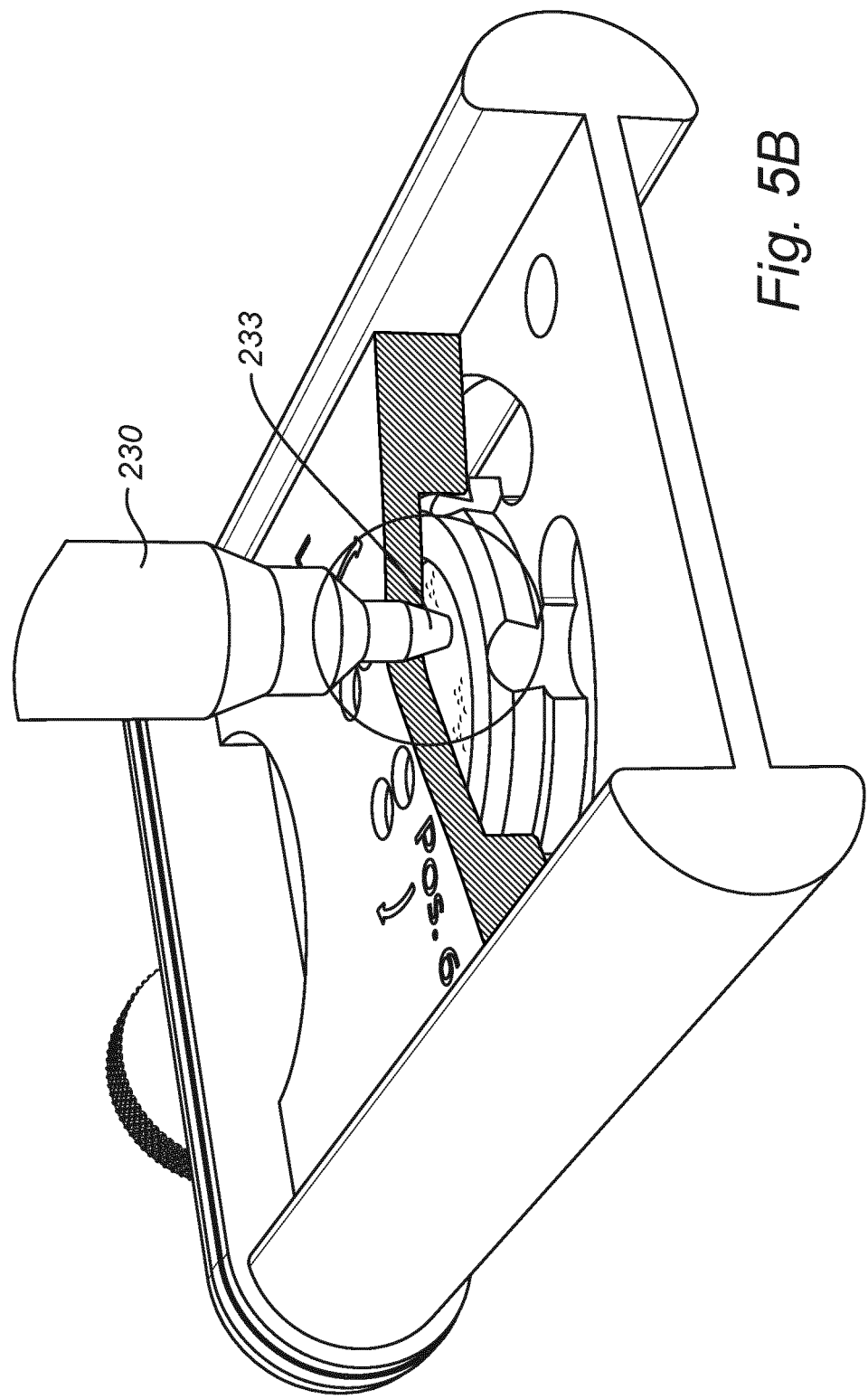

SAMPLE PREPARATION DEVICE

CROSS REFERENCE TO RELATED APPLICATIONS

This application is a U.S. National Phase Application of International Application No. PCT/EP2022/059988, filed Apr. 14, 2022, which claims priority to Swedish Patent Application No. 2150486-5, filed Apr. 19, 2021, each of which are hereby incorporated by reference in their entirety.

TECHNICAL FIELD

The present disclosure pertains to a sample preparation device for preparing a sample containing particles collected onto a collection plate, and a method for using the sample preparation device for preparing samples with particles collected onto a collection plate.

BACKGROUND OF THE INVENTION

The human airways are daily confronted with at least 7-8 cubic meters of air and there is an advanced biological system to detoxify inhaled particles and gases. The first line of defense against inhaled material is the Respiratory Tract Lining Fluid (RTLF), covering all the airways. The RTLF, besides taking part in the innate immunity, contains several important antioxidant systems and acts as a surfactant decreasing surface tension of inhaled material.

The composition of RTLF has been shown to change in inflammatory conditions of the airways. When the balance between antioxidants in RTLF and inhaled oxidants is disturbed, oxidative stress will initiate an inflammatory process. This inflammatory process, although very variable, is a major early event which is common in the development of most respiratory diseases, from asthma to lung cancer.

The pathophysiological processes leading to respiratory diseases are so far not fully understood. One reason for this is that those processes are difficult to monitor in humans. Examples of methods used to evaluate the effect of various exposures include measurement of lung-function, exhaled nitric oxide, induced sputum or analysis of broncho-alveolar lavage (BAL) or biopsies from bronchoscopy. Unfortunately, these methods are associated with disadvantages such as being too invasive, provision of variable results and/or involving risks.

Further methods used include in-vitro studies, which only allow limited generalizations to the complex environment of human airways. The same is to a large extent true for animal studies, where—although genetic concordance to humans is high—the expression of various genes differs substantially.

Still a further method that has been introduced is collection of exhaled breath condensate (EBC). This method entails analysis of exhaled water vapor that is condensed by the means of low temperature, where both volatile and non-volatile compounds have been identified. The non-volatiles found in EBC are believed to originate from particles formed within the airways. The collection of exhaled breath condensate (EBC) relates to a number of serious methodological difficulties such as dilution with water resulting in very low concentrations of the substances of interest, high contamination with substances originating from the oral cavity, high intra-individual coefficient of variation and a very inefficient way to sample the non-volatiles found in EBC.

WO 2009/045163 and WO 2019/011750 both disclose a system for collecting exhaled particles, said systems comprising a mouthpiece into which a subject exhales air containing particles into an inlet of an inertial impactor. The impactor comprises one or more collection plates onto which the exhaled particles are collected in specific areas. However, the number of certain types of particles exhaled is in some instances very low, and due to the method of collecting the particles onto collection plates the signal from these particles becomes very weak or even undetected in subsequent analyses. Hence, there is a need to find a way to improve signals from the collected particles.

SUMMARY OF THE INVENTION

An object of the present invention is to overcome or ameliorate at least one of the disadvantages of the prior art, and the above objects may be achieved with a sample preparation device in accordance with claim 1, and a method as set forth in claim 12. Further embodiments are set out in the dependent claims, the description and in the drawings.

As set out herein, there is provided a sample preparation device for preparing a sample containing particles collected onto a collection plate. The sample preparation device comprises a holding device for securing said collection plate during collection of the sample of particles P from the collection plate.

The sample preparation device further comprises a device for punch cutting provided with a sample collector for collecting a sample of said particles P from the collection plate. The sample preparation device also comprises a guiding device comprising two or more guide bores for receiving and guiding the sample collector during collection of the sample of particles P from the collection plate.

The guiding device extends a first length along a plane x between a first transverse side and a second transverse side. The guiding device extend a second length along a plane y, said plane y being perpendicular to said plane x. The guiding device extends a third length along a plane z, plane z being perpendicular to both planes x and y, the third length defining a distance between a punch receiving side and a coupling side of the guiding device.

The guiding device comprises a centerline A extending parallel along said plane x, dividing the guiding device into equally sized first half and second half, wherein the two or more guide bores are asymmetrically located relative to the centerline A in the first and/or second halves.

The guiding device is configured to be connected to the holding device in either a first punching position Pos.1 or a second punching position Pos.6. wherein in the first punching position Pos.1 the first transverse side faces in a first direction parallel to the plane x, and in the second punching position Pos.6, the guiding device is turned 180° along said x, y-plane, whereafter the first transverse side faces in a second direction parallel to the plane x. The first and second directions are parallel to plane x, the second direction being directly opposite to the first direction.

A sample preparation device as recited above will enable the user to process the collection plate with particles in a manner which, compared to the normally practiced analysis method, will significantly enhance the chance for detecting particles P present only in minute amounts in the sample. The sample preparation device enables the user to significantly increase the signal of particles in the sample to be analyzed. Thereby samples containing concentrations of particles which normally are close to, or below the limit of detection when using the standard method, will now give a signal that may be detected and/or quantified.

The collection plate containing particles is advantageously secured to a plate holding frame arranged in the holding device by means of a locking ring. Preferably the locking ring is magnetic which facilitates the securing of the collection plate to the holding device which advantageously is made of a magnetic material.

The front end of the device for punch cutting is configured with a sample collector adapted to be pushed through the collection plate during collection of the sample. The sample collector is hollow inside with a foremost front end provided with a sharpened cutting edge. The sharp cutting edge enables the sample collector to cut through the collection plate to punch out the pile of particles which has been collected onto the collection plate. The punched-out sample of particles will collect inside the hollow tube and can be dislodged into e.g., a test tube for subsequent analysis.

The holding device comprises a first and a second receiving hole configured to receive a first and second guide pin provided on the coupling side of the guiding device. The guiding pins and receiving holes ensure that the guiding device is perfectly aligned when it is connected to either the first punching position Pos.1 or second punching position Pos.6 on the holding device.

When the guiding device is connected to said holding device in a first punching position Pos.1, the first guide pin is received into said first receiving hole, and the second guide pin is received into the second receiving hole. When the guiding device is connected to the holding device in a second punching position Pos.6, the first guide pin is received into the second receiving hole, and the second guide pin is received into the first receiving hole.

The two or more guide bores advantageously have a conical shape with an entrance diameter at the punch receiving side which is larger than an exit diameter at the coupling side. The front end of the sample collector advantageously has a conical shape configured to fit into the two or more conical shaped guide bores provided in the guiding device. When the front end is placed into a guide bore, the conical shapes of the sample collector and guide bores enable the sharpened cutting edge of the sample collector to align perfectly for collecting the pile of particles P deposited on the collection plate.

Once the front end of the sample collector abuts the bottom of the conical guide bore, the sharpened edge at the foremost front end protrudes from the guide bore on the coupling side of the guiding device, and the sharpened cutting edge of the hollow sample collector is pushed through the collection plate. This allows the pile of particles P to be punched from the collection plate and collected inside the hollow sample collector.

The guiding device is provided with three, four, five or more guide bores asymmetrically located relative to the centerline A in the first and/or second halves. Advantageously the guiding device is provided with five guide bores asymmetrically located relative to the centerline A in the first and second halves.

The advantageous design of the guiding device enables precise collection of the piles of particles P by means of the device for punch cutting despite the small size of the piles and the narrow space between the deposited piles. Due to the asymmetric placement of the guide bores relative to the centerline A in the first and/or second halves on the guiding device, there is provided ample room for the front end of the device for punch cutting to align the sample collector with every second pile of particles P in each crescent-shaped group when the guiding device is connected in the first punching position Pos.1 and second punching position Pos.6 respectively.

A further object set out herein is to provide a method for preparing/processing samples containing particles collected onto a collection plate, using the sample preparation device as described herein. The method comprising the following steps a) providing the holding device securing the collection plate containing particles P to be analyzed;
b) aligning and connecting the guiding device provided with two or more guide bores to said holding device in the first punching position Pos.1;
c) providing the device for punch cutting provided with a sample collector; and
d) when said guiding device is connected to the holding device in said first punching position Pos.1, collecting samples by means of said sample collector from said collection plate through each one of said two or more guide bores provided on said guiding device; and
d) aligning and connecting said guiding device provided with two or more guide bores to said holding device in a second punching position Pos.6;
and
e) when said guiding device is connected in said second punching position Pos.6, collecting samples by means of said sample collector from said collection plate through each one of said two or more guide bores provided on said guiding device.

BRIEF DESCRIPTION OF THE DRAWINGS

FIGS. 4A-B are views of the guiding device as disclosed herein wherein FIG. 4A is a view of the punch receiving side 252, and FIG. 4B is a view of the plate coupling side 253.

FIGS. 5A-H disclose the steps for using the sample preparation device 200 disclosed herein wherein FIG. 5A discloses how guide bores 251 extend through the guiding device 250 from a punch receiving side 252 to a plate coupling side 253.

FIG. 5B discloses the guiding device 250 being arranged to the tray section 211 of the holding device 210 in the first punching position Pos.1.

FIG. 5C discloses a collection plate onto which piles of particles p1-p10 have been collected.

FIG. 5D is a cut-out view of the sample collector 233 collecting a sample from the collection plate when guided by the guiding device 250.

FIG. 5E is a view of the collection plate after five samples have been collected with the guiding device 250 in the first punching position Pos.1.

FIG. 5F is a view of the guiding device 250 being switched between a first punching position Pos.1 and a second punching position Pos.6.

FIG. 5G discloses the guiding device 250 being arranged to the tray section 211 of the holding device 210 in the second punching position Pos.6.

FIG. 5 H is a view of the collection plate after ten samples have been collected from the collection plate.

DETAILED DESCRIPTION

WO 2009/045163 and WO 2019/011750 both disclose a system for collecting exhaled particles by means of an impactor, as well as the method used for collecting such particles using the system. The most important steps when using this system is summarized below.

Figure 1:
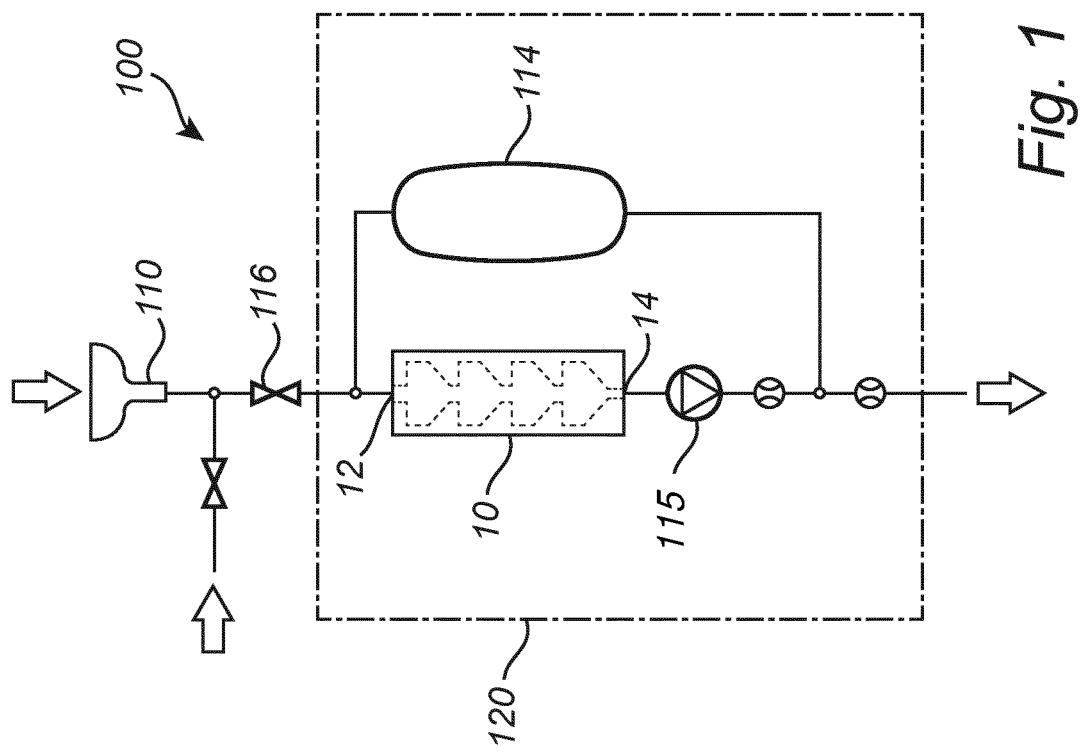
FIG. 1 discloses a system for collecting particles exhaled by a subject.

FIG. 1 discloses a system for collecting particles exhaled by a subject. The system 100 is arranged to maintain a constant flow of air exhaled through the impactor 10 by means of a pump 115. The air exhaled by the subject passes through a mouthpiece 110 and enters an inertial impactor 10, and a reservoir 114 since the impactor capacity usually is insufficient for handling an entire exhalation at a time. Thus, any exhaled air exceeding the impactor capacity enters the reservoir 114. Part of the system is located within a temperature regulated compartment 120.

When the subject finishes his/her exhalation, the first valve 116 is closed. The pump 115 will then draw the exhaled air stored in the reservoir 114 through the impactor 10, thereby maintaining a continuous flow of exhaled air through the impactor 10.

The entire, or substantially the entire volume of each exhalation by a subject may be examined. The system is operated without requiring external air to be added to the reservoir 114 to maintain a flow through the system, thereby reducing a risk for contamination associated with added external air.

Figure 2:
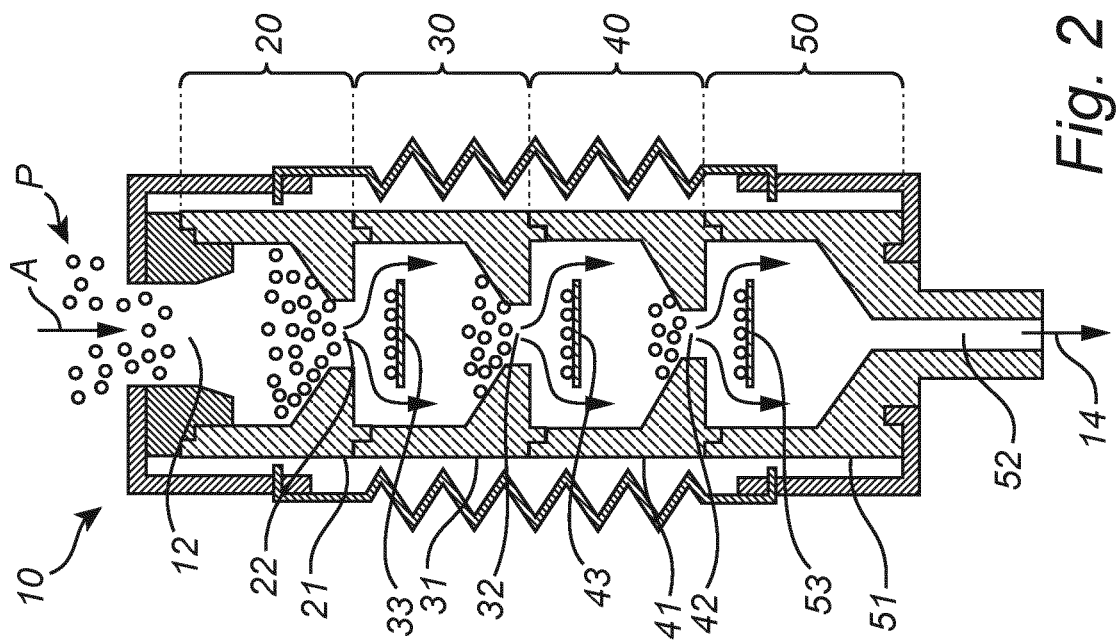
FIG. 2 discloses four stages 20, 30, 40, 50 of an impactor used in the system for collecting particles exhaled by a subject.

The inertial impactor 10 may be any inertial impactor known in the art and suitable for use in a medical application (see FIG. 2). The system as disclosed herein includes an inertial impactor 10 comprising an inlet 12 and an outlet 14, and a plurality of stages 20, 30, 40, 50 arranged such that a gas stream A comprising particles P enters the impactor via the inlet 12 and passes through each stage in turn before exiting the impactor via the outlet 14. FIG. 2 illustrates four stages 20, 30, 40, 50 although impactors with from two to fifteen stages are known. The flow through the impactor 10 is caused by a pump 115 connected to the outlet 14 of the impactor.

Each stage is separated from adjacent stages by a partition 21, 31, 41, 51, wherein each partition has at least one orifice 22, 32, 42, 52 (in practice, a plurality of orifices is present in each partition) which directs the gas stream A towards collection plates 33, 43, 53. The major face of each collection plate is arranged substantially perpendicular to the direction of flow of the gas stream, and when the particles P exit the at least one orifice 22, 32, 42, 52 they will impact onto the surface of the subsequent collection plate 33, 43, 53 and form a neatly contained pile 34, 44, 54 of particles P thereon. This means that if for example the first partition 21 has ten orifices 22.1-22.10, ten separate piles 34.1-34.10 of particles P will form onto the first collection plate 33 in a pattern corresponding to the pattern of the orifices 22.1-22.10.

Particles with inertia such that they are unable to follow the air stream when it is deflected around the first collection plate 33, will impact the first collection plate 33, while particles with less inertia will continue to the next stage 40. The inertia of a particle depends on its mass which, in turn, depends on its size. In this way, mass or size-segregation of the particles is possible. Thus, by choosing the number of orifices, their diameter, and the distance from orifice to collection plate in each stage, mass, or size segregation of the particles in an aerosol is achieved. The increase in concentration of the material on the collection plates, compared with the exhaled air or the breath condensate, is considerable.

The collection plates may have a thickness of from about 0.4 micrometer to about 1 micrometer. The collection plates may be square shaped with 10-12 mm side, or the collection plates may have a circular shape, optionally with a diameter of about 25 mm. The plates may be made of elemental silicon, hydrophilic/hydrophobic Teflon, hydrophilic glass fibre, hydrophilic mixed cellulose esters, hydrophilic polycarbonate, hydrophobic polyvinylidene fluoride filter paper substrate and/or have a modified surface adapted for the intended analysis.

A single exhalation may provide a sufficient number of particles, although typically, particles are collected from repeated exhalations. For the diagnosis of medical conditions in humans, particles may be collected from continuous inhalations/exhalations for a period of time comprising up to several tens of minutes, e.g., between 1 second and 100 minutes, such as between 1 second and 50 minutes, between 5 seconds and 20 minutes or between 10 seconds and 5 minutes.

By varying the exhalation pattern, it is also possible to collect particles which are representative from different portions of the respiratory tract.

A sample is taken in the following way. It is assumed that the impactor 10 is loaded with clean collection plates 33, 43, 53, and that the system, especially the impactor 10, has attained the desired temperature. First, the flow meter is zeroed to allow a proper measurement of flows, thereafter the moist clean air flow is set at a value so that a positive flow will be maintained from the system during measurement. Then the impactor flow is set at a value lower than the clean air flow. During this procedure, no deposit will be collected on the plates 33, 43, 53, since the system is fed by clean particle free air. Then the optical particle counter is started, and it is checked that no spurious particles are present, e.g., indicating a leak into the system. Exhalation into the system then begins, the particle counter continuously draws the exhaled air through the impactor and produces a size distribution at certain set time intervals, such as e.g., every 0.5, 1, 5, 10 or more seconds while the impactor 10 collects samples for later analysis. When a required amount of sample has been obtained, the collection is terminated, the time of sampling and exhaled volume recorded. The flow through the impactor 10 is turned off, the collection plate holding device is removed from the impactor system and the loaded collection plates 33, 43, 53 are recovered from the holding device.

The one or more impactor collection plates 33, 43, 53 are removed and analyzed as to their chemical content. The analysis may be performed while the exhaled air components and/or particles remain on the plates and/or after the exhaled air components and/or particles have been removed from the plates. The analysis may be performed using standard analytical techniques as known in the art. The analysis will then provide an insight into the medical condition of the subject undergoing examination.

As described above, the particles are deposited as neat piles onto the collection plate 33, 43, 53 in a specific pattern during sample collection in the impactor 10. In one analysis strategy, the particles are analyzed while still on the collection plates. In another analysis strategy, the collected material is removed (washed off) from the collection plates, and the washing solution containing the collected particles can then be further processed for different chemical or biochemical analysis techniques.

The number of particles collected onto the collection plates 33, 43, 53 is often very scarce and on or near the limit of detection (LOT). It is therefore of uttermost importance that the samples collected onto the collection plates 33, 43, 53 are not diluted more than necessary. Due to the design of the impactor 10 in the system 100 described above, the particles of interest are only collected onto a very limited area of the total surface of the collection plate 33, 43, 53. A problem facing the analyst is that a large volume of washing solution is required to remove the particles from the collection plate 33, 43, 53 resulting in an unwanted dilution of the particles. Sometimes particles will be undetected due to this dilution effect. To increase the particle concentration for subsequent analyses, the piles of particles P collected onto the collection plate 33, 43, 53 are advantageously individually processed by means of a sample preparation device 200 as described herein.

The sample preparation device 200 disclosed herein will significantly increase the concentration of particles P in the sample for subsequent analyses such that amounts of particles which normally are close to, or below the limit of detection, now will give a signal that may be detected and/or quantified.

Figure 3:
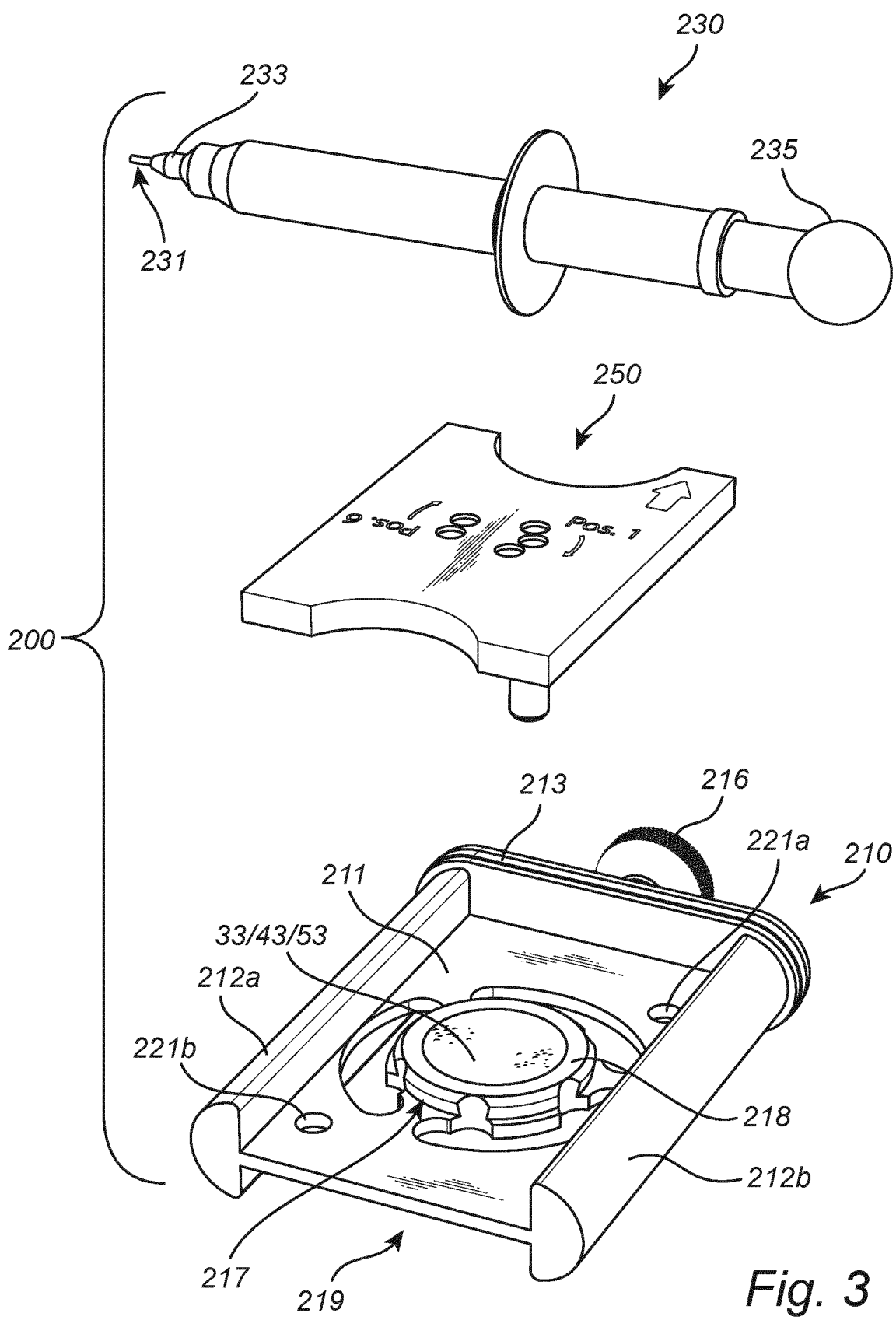
FIG. 3 is a view of the sample preparation device 200 disclosed herein.

The sample preparation device 200 disclosed herein is shown in FIG. 3 and comprises
- a holding device 210 for securing a collection plate 33, 43, 53 during collection of the sample of particles P from the collection plate 33, 43, 53; and
- a device for punch cutting 230 (hereinafter called punch cutter 230) provided with a sample collector 233 for collecting a sample with particles P from the collection plate 33, 43, 53; and
- a guiding device 250 comprising two or more guide bores 251 for receiving and guiding the sample collector 233 during collection of the sample of particles P from the collection plate 33, 43, 53.

During collection of particles P from the exhaled breath, the collection plate 33, 43, 53 onto which the exhaled particles P have been deposited, is firmly secured to a holding device 210. After termination of the collection of particles P onto the collection plates 33, 43, 53, the holding device 210 for each collection plate 33, 43, 53 is removed from the impactor 10. However, instead of also removing the collection plate 33, 43, 53 from the holding device 210, the collection plate 33, 43, 53 may remain firmly secured in the holding device 210, for the subsequent sampling step.

The holding device 210 (as best seen in FIG. 3) for holding and securing the collection plate 33, 43, 53, is configured with a tray section 211 provided with a plate holding frame 217 configured to receive and hold the collection plate 33, 43, 53 during collection of particles from the exhaled air. The collection plate 33, 43, 53 is firmly secured in the plate holding frame 217 by means of a locking ring 218. Advantageously the locking ring 218 is magnetic which facilitates loading and unloading of collection plates 33, 43, 53 in the plate holding frame 217.

The tray section 211 is provided with guiding edges 212*a*, 212*b*, 213 along three of its sides, which extend in a direction perpendicular to and away from first and second surfaces of the tray section 211. The guiding edge 213 along a first transverse side of the tray 211 is advantageously provided with a handle 216 to facilitate handling of the holding device 210. The side of the holding device 210 opposite to the transverse guiding edge 213 provided with the handle 216 may be left open 219. Advantageously the holding device 210 is made from e.g., stainless steel, aluminum, or plastic to facilitate cleaning between samples.

The sample preparation device further includes the punch cutter 230, for collecting samples from the collection plates 33, 43, 53. The front end of the punch cutter 230, as best seen in FIG. 3, is provided with a sample collector 233 configured to sample individual piles of particles P from the collection plate 33, 43, 53. The sample collector 233 is hollow and its foremost end is open and the opening is provided with sharp cutting edge 232 (see FIG. 5*d*), The diameter of front end opening on the sample collector 233 is slightly larger than the diameter of the piles of particles P that have been collected onto the collection plates 33, 43, 53. The punch cutter 230 is configured to push the sample collector 233 through said collection plate 33, 43, 53 during collection of the sample, receiving the punched-out sample with the pile of particles P inside the hollow space of the sample collector 233.

The exhaled particles P are deposited as neat piles onto the collection plate 33, 43, 53 in a specific pattern during particle collection in the impactor. However, since the deposited piles of particles P are invisible on the collection plate 33, 43, 53 they are difficult to locate without an indication of where on the collection plate surface they have impacted. Thus, to facilitate sampling of the piles of particles P from the collection plate 33, 43, 53, the sample preparation device includes a guiding device 250 to indicate where on the collection plate 33, 43, 53 the piles of particles P have been deposited.

Figure 4A:
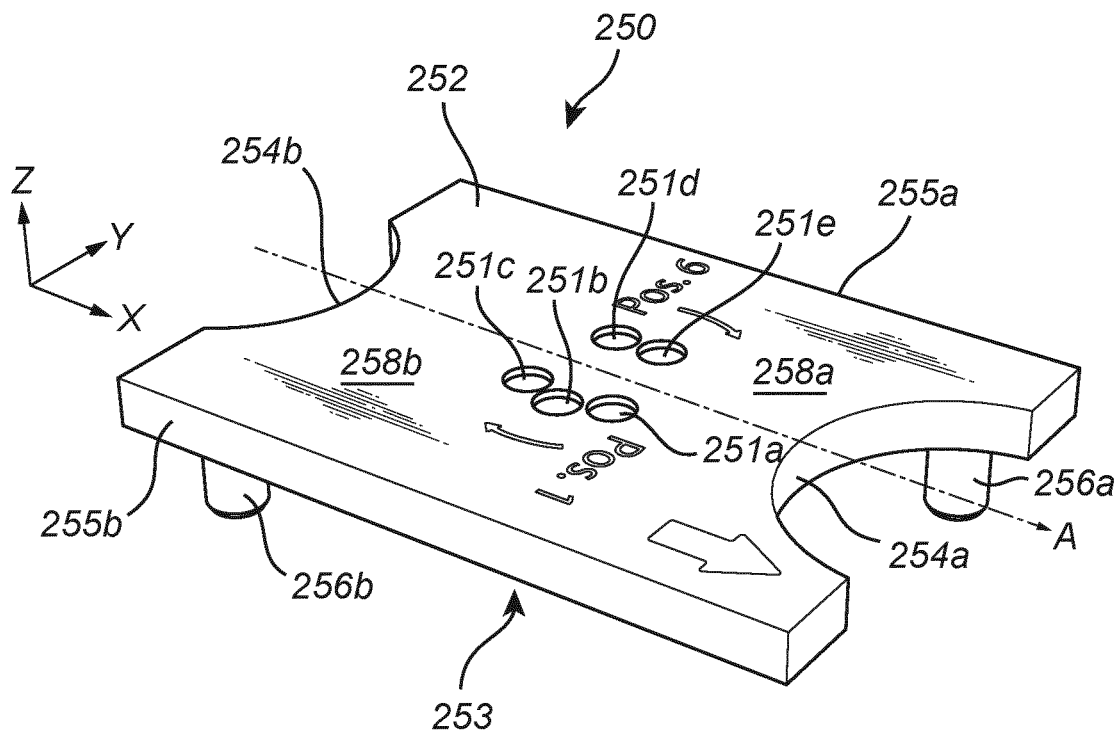
Figure 4B:
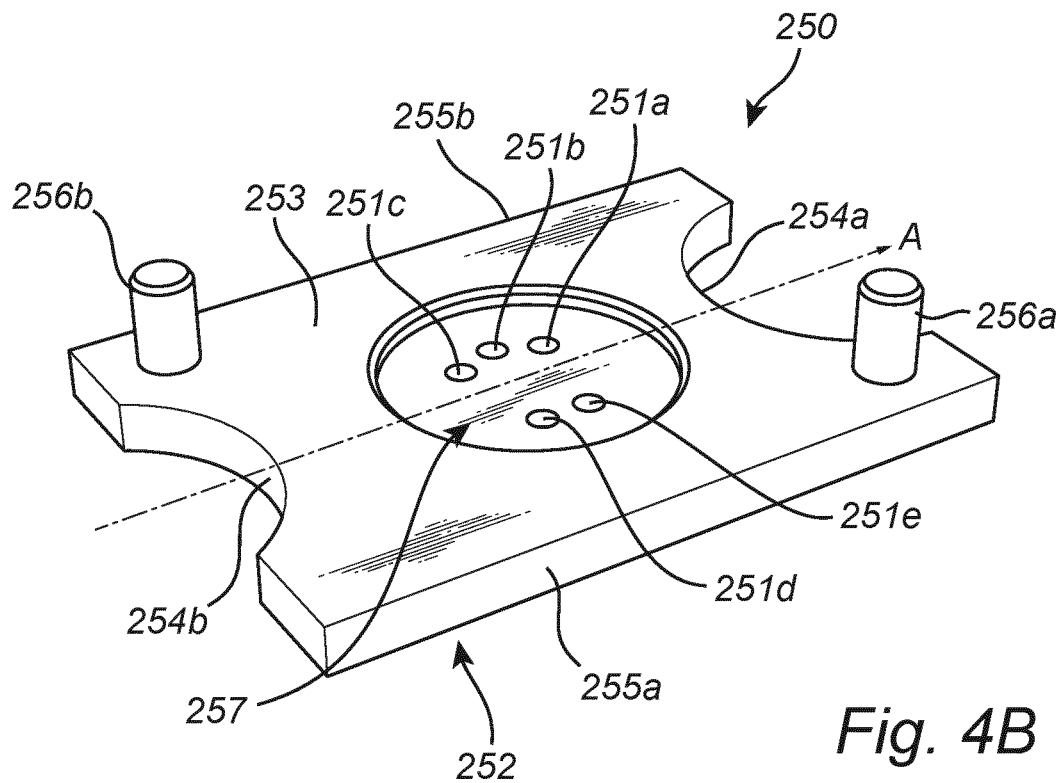
Figure 5C:
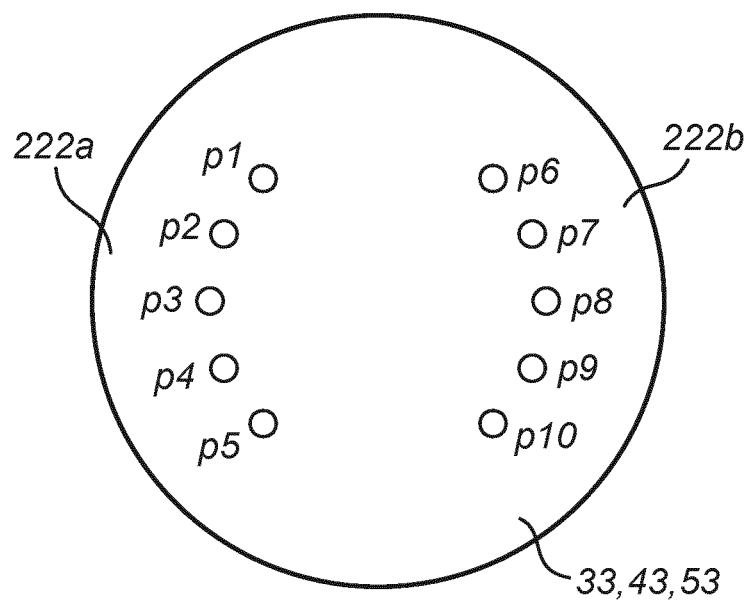

The guiding device 250, which is best seen in FIGS. 4A and 4B, is provided with two or more guide bores 251 configured for receiving and guiding the front end of the sample collector 233 during collection of the piles of particles P from the collection plate 33, 43, 53. The guide bores 251 extend through the guiding device 250 from a punch receiving side 252 to a plate coupling side 253 (see FIG. 5A).

The guiding device 250 extends a first length along a first plane x between a first transverse side 254*a* and a second transverse side 254*b*. The first length defines the length of the guiding device 250. Advantageously the first and second transverse sides 254*a*, 254*b* are provided with indentations which facilitate gripping of the guiding device 250 by hand.

The guiding device 250 extends a second length between two longitudinal sides 255*a*, 255*b* in a second plane y, which is perpendicular to the first plane x, the second length defining the width of the guiding device 250.

The guiding device 250 extends a third length along a third plane z, wherein the third plane z is perpendicular to both planes x and y. The third length defines the thickness of the guiding device 250, i.e., the distance between the punch receiving side 252 and the coupling side 253. The guiding device 250 may have a square or a rectangular design, but it is advantageously configured with a shape that enables it to be arranged with an exact fit in the tray section 211 between guiding edges 212*a*, 212*b*, 213 of the holding device 210.

The guiding device 250 is arranged to be connected to the tray section 211 of the holding device 210 in either a first punching position Pos.1 (see FIGS. 5A and 5B) or a second punching position Pos.6 (see FIG. 5G), with the plate coupling side 253 of the guiding device 250 facing the collection plate 33, 43, 53 in both positions. In the first punching position Pos.1 the first transverse side 254*a* of the guiding device 250 faces in a first direction, and in the second punching position Pos.6, the guiding device 250 is turned 180° along the x, y-plane, whereafter the first transverse side 254a now faces in a second direction, said second direction being directly opposite to said first direction. This can be seen in FIG. 5A wherein in the first position Pos.1 the first transverse side 254a of the guiding device 250 faces the guiding edge 213 along a first transverse side of the tray 211, and in the second position Pos.6, the guiding device is turned is turned 180° along the x, y-plane whereafter the first transverse side 254a now faces the open side 219 of the tray section 211 (see FIG. 5G).

To ensure proper alignment when connecting the guiding device 250 to the holding device 210 in the different punching positions Pos.1 and Pos.6, the tray section 211 of the holding device 210 is provided with first and second receiving holes 221a, 221b (see FIG. 3) configured to receive first and second guide pins 256a, 256b arranged on the coupling side 253 of the guiding device 250 See FIG. 4B). The first and second receiving holes 221a, 221b are arranged in the tray section 211 of the holding device 210 along the first and second guiding edges 212a, 212b respectively, with the first receiving hole 221a being located towards the transverse guiding edge 213a and the second receiving hole 221b being located towards the open side 219.

Figure 5D:
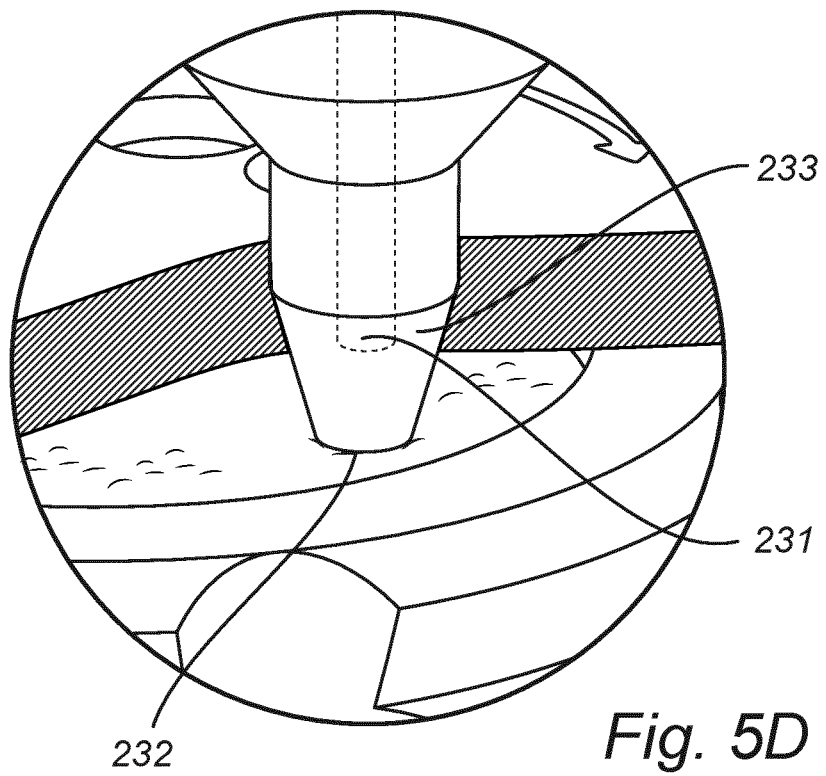
Figure 5E:
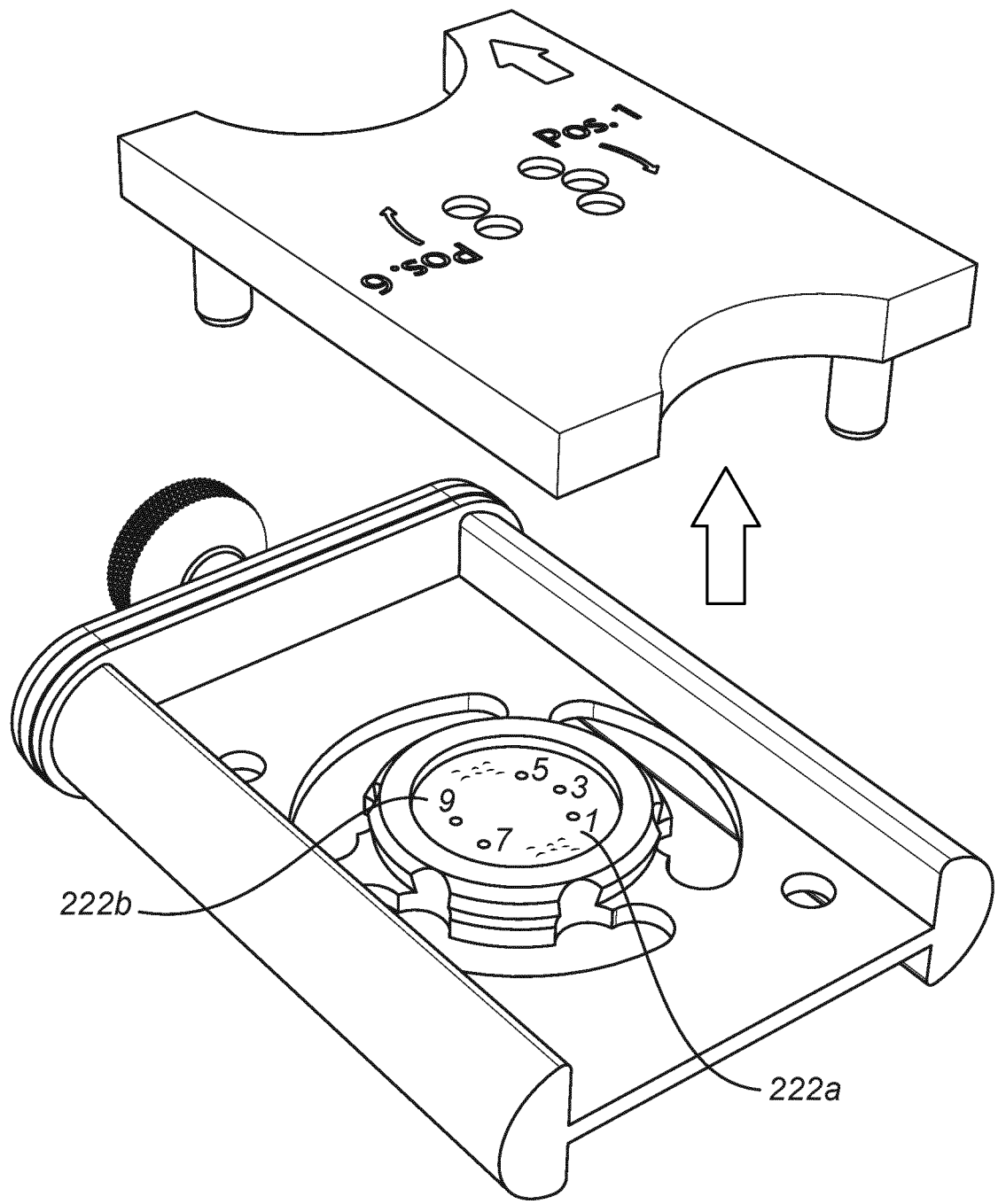
Figure 5F:
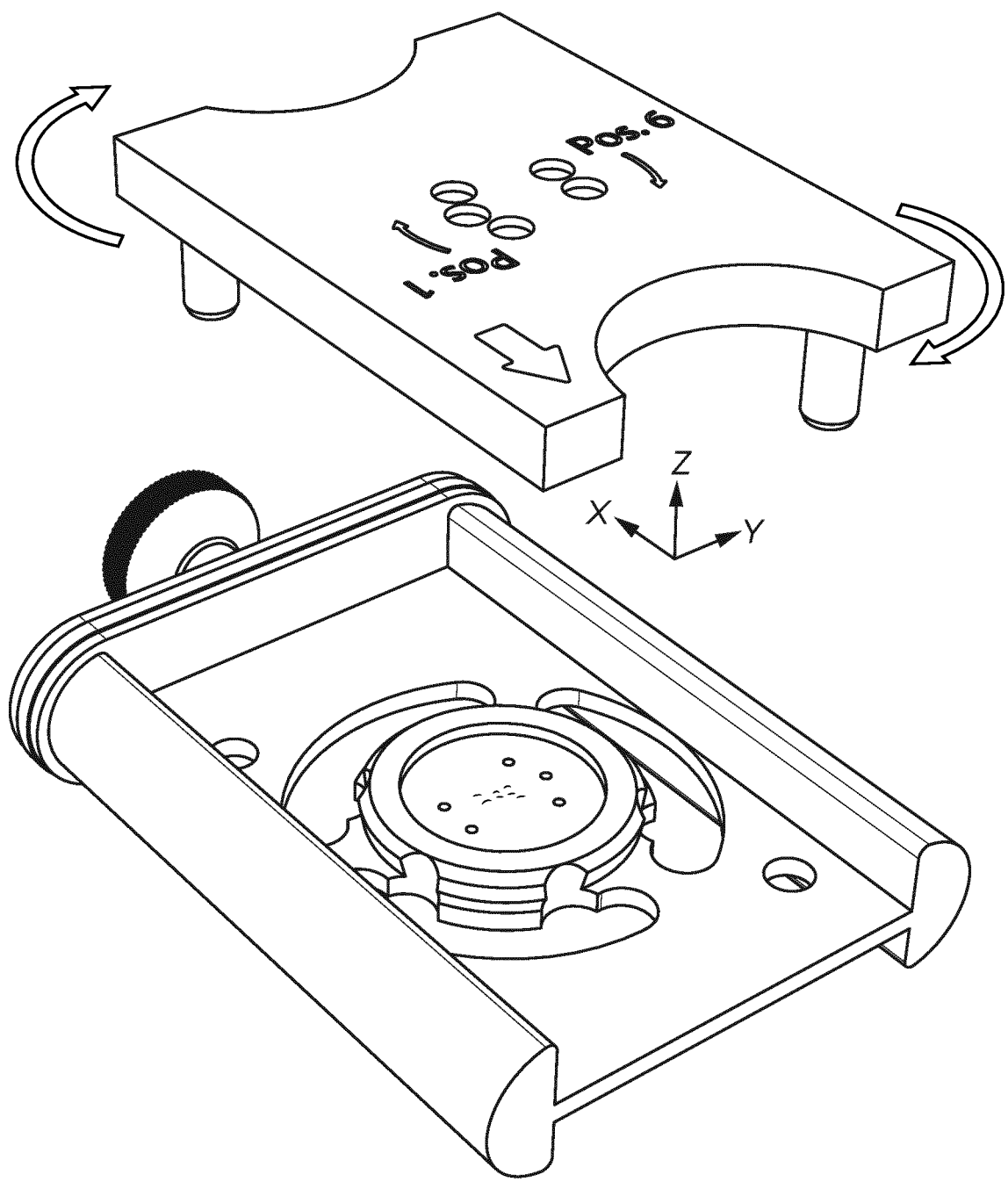
Figure 5G:
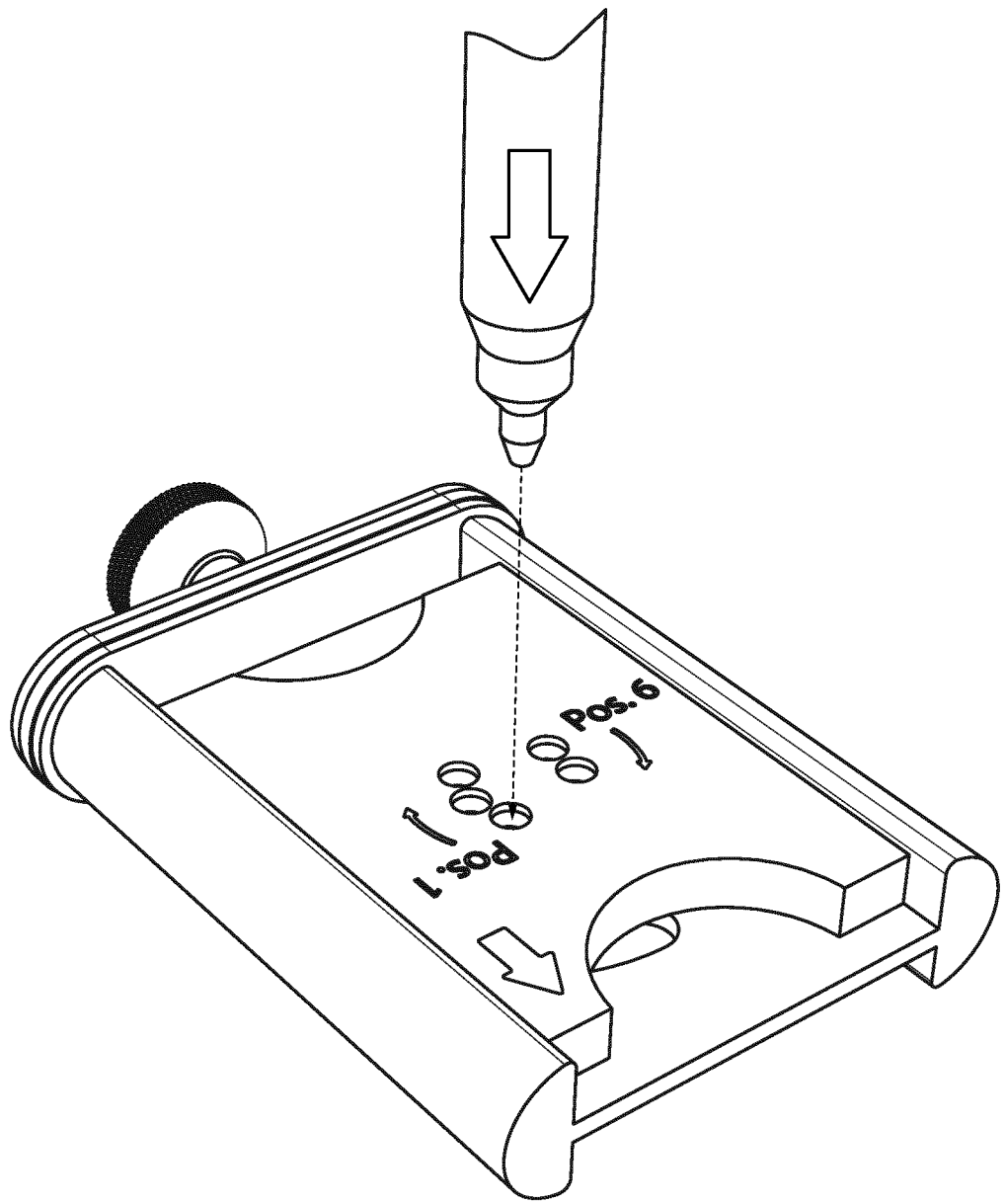

When the guiding device 250 is connected to the holding device 210 in a first punching position Pos.1, the first guide pin 256a of the guiding device 250 is received into the first receiving hole 221a of the holding device 220, and the second guide pin 256b is received into the second receiving hole 221b as seen in FIG. 5A. When connecting the guiding device 250 in a second punching position Pos.6, the guiding device 250 is turned 180° along the x-, y-plane (see FIG. 5F) whereafter the first guide pin 256a of the guiding device 250 is received into the second receiving hole 221b of the holding device 210, and the second guide pin 256b is received into the first receiving hole 221a as seen in FIG. 5G.

A cut-out 257 is (see FIG. 4B) arranged on the coupling side 253 of the guiding device 250. The cut-out 257 is configured to receive the plate holding frame 217 with the collection plate 33, 43, 53 secured by the locking ring 218 when the guiding device 250 is connected to the holding device 210 in one of the first or second punching positions Pos.1, Pos.6. The cut-out 257 is slightly deeper than the total height of the plate holding frame 217 when fitted with the collection plate 33, 43, 53 and the locking ring 218, thereby leaving a small distance between the surface of the collection plate 33, 43, 53 and a bottom surface of the cut-out 257 (see FIG. 5A). The cut-out 257 will further ensure the correct fitting of the guiding device 250 inside the tray section 211 of the holding device 210.

A centerline A extends parallel to plane x which divides the guiding device 250 into equally sized first and second halves 258a and 258b respectively (see FIG. 4A). The two or more guide bores 251 are asymmetrically located relative to said centerline A in said first and/or second halves 258a, 258b. The expression "guide bores being asymmetrically located relative to the centerline A" is intended to mean that the two or more guide bores 251 cannot be located such that the first and second halves 258a, 258b of the guiding device 250 form mirror images of each other. For a guiding device 250 comprising two guide bores 251a, 251b, both guide bores 251a, 251b may for example be located in the first half 258a (i.e. both guide bores are located only on one side of the centerline A) of the guiding device 250, while no guide bores are located on the second half 258b. Alternatively, a first guide bore 251a is located close to the first transverse side 254a on the first half 258a of the guiding device 250, while a second guide bore 251b is located towards the middle of the second half 258b.

The guiding device 250 may be provided with 3, 4, 5 or more guide bores 251 for receiving and guiding the sample collector 233 during the collection of piles of particles P from the collection plate 33, 43, 53. Advantageously, the guiding device 250 is provided with a number of guide bores 251 that equals half the number of piles of particles P deposited onto the collection plate 33, 43, 53. Thus, if twelve piles of particles P are deposited onto the collection plate 33, 43, 53, the guiding device 250 will contain six guide bores 251a-f. If the collection plate 33, 43, 53 contains eight piles of particles P, the guiding device 250 will contain four guide bores 251a-d, etc.

In an advantageous embodiment, ten piles of particles are deposited onto the collection plates 33, 43, 53, as two crescent-shaped groups 222a and 222b (see FIG. 5C) with five piles p1-5 in the first crescent-shaped group 222a, and five piles p6-10 in the second crescent-shaped group 222b. Thus, the guiding device 250 used for this embodiment is provided with five guide bores 251a-e asymmetrically located relative to the centerline A of the guiding device 250 as seen in FIG. 4A. The reason for the asymmetric placement of the guide bores 251 is explained below.

The guide bores 251 advantageously have a conical shape extending in the plane z from the punch receiving side 252, through the guiding device 250 to the coupling side 253 (see FIG. 5A). The guide bores 251 have an entrance diameter at the punch receiving side 252 of the guiding device 250 which is larger than the exit diameter at the coupling side 253. It should be noted that the exit diameter is slightly larger than the diameter of the foremost front end of the hollow sample collector 233, which in turn is slightly larger than the diameter of the piles of particles P deposited onto the collection plates 33, 43, 53. This means that the diameter of the pile of particles P deposited onto the collection plate 33, 43, 53 is considerably smaller than the entrance diameter of the guide bore 251 on the punch receiving side 252 of the guiding device 250.

To properly align the sharpened cutting edge 232 of the hollow sample collector 233 with the positions of the piles of particles P deposited onto the collection plates 33, 43, 53, the front end of the sample collector 233 is provided with a conical profile configured to fit exactly into the conical shape of the guide bores 251. When the sample collector 233 is placed into a guide bore 251, the sharpened cutting edge 232 of the sample collector 233 is perfectly aligned for cutting and collecting the deposited pile of particles P from the collection plate 33, 43, 53 as seen in FIG. 5D. Advantageously, the bottom of the plate holding frame 217 is fitted with a pad (not shown) having a resilient surface, on top of which the collection plate 33, 43, 53 is placed and secured with the locking ring 218.

Once the front end of the sample collector 233 abuts the bottom of the conical guide bore 251, the sample collector 233 protrudes from the guide bore 251 on the coupling side 253 of the guiding device 250, and the sharpened cutting edge 232 of the hollow sample collector 233 is pushed through the collection plate 33, 43, 53 all the way towards the resilient surface of the pad (see e.g., FIGS. 5B and 5D). This allows the pile of particles P to be punched from the collection plate 33, 43, 53 and collected inside the hollow tube of the sample collector 233. To release the punched-out pile or piles of particles P, an actuator is pushed on the punch cutter 230 which actuates a push rod 231 inside the hollow sample collector 233 to push the one or more punched-out piles from the hollow sample collector 233 into e.g., a test tube for subsequent analysis. In this way the piles of particles P deposited onto the collection plates 33, 43, 53 may be collected and analyzed individually or collectively depending on whether the punched-out piles are put in one or separate test tubes.

Since the piles of particles P deposited onto the collection plate 33, 43, 53 are located very close to one another and that their diameter is very small compared to the diameter of the front end of the sample collector 233, there is no room to fit all guide bores 251 of a crescent-shaped group 222a, 222b next to one another on the guiding device 250. Instead, only every second pile of particles P is matched with a guide bore 251 on the guiding device 250 as explained below.

The procedure for collecting samples containing particles from the collection plate 33, 43, 53 using the sample preparation device 200 will now be described. After having collected particles exhaled by a subject onto a collection plate 33, 43, 53 by means of the impactor described above, the holding device 210 is removed from the impactor 10.

The guiding device 250 is connected to the holding device 210 in a first punching position Pos.1 by aligning the first and second guide pins 256a, 256b provided on the coupling side 253 of the guiding device 250 with the first and second receiving holes 221a, 221b provided in the tray section 211 of the holding device 210. It is important to make sure that the plate holding frame 217 is properly received in the cut-out 257 on the coupling side 253 of the guiding device 250 (see FIG. 5A).

The front end of the sample collector 233 is placed inside a first conical guide bore 251a and pushed all the way to the bottom of the guide bore 251. Once the foremost front end abuts the bottom of the guide bore 251, the sample collector 233 protrudes through the guide bore 251 on the coupling side 253 of the guiding device 250 and the sharpened cutting edge 232 of the hollow sample collector 233 is pushed through the collection plate 33, 43, 53, all the way towards the resilient surface of the pad (see FIGS. 5B and 5D). This allows the pile of particles P to be punched from the collection plate 33, 43, 53 and collected inside the hollow sample collector 233.

Thereafter the punch cutter 230 is removed from the guide bore 251, and the collected sample with the pile of particles P may be removed from the hollow sample collector 233 by actuating an actuator on the punch cutter 230, thereby dislodging the punched-out pile of particles P by means of the pushrod 231 into e.g., a test tube for subsequent analysis. Thereafter, sample collection is repeated for the remaining four guide bores 251b-e.

When all five sample piles have collected with the guiding device 251 in a first punching position Pos.1, the guiding device 250 is removed from the holding device 210. As can be seen in FIG. 5E, five piles of particles have been collected from the collection plate 33, 43, 53, three piles from a first crescent-shaped group 222a, and two piles from the second crescent-shaped group 222b. However, the three piles of particles P removed from the first crescent-shaped group 222a are not three piles located next to each other, but instead piles p1, p3 and p5 are removed. In the second crescent-shaped group 222b piles p7 and p9 are removed. The sampled piles p1, p3, p5, p7 and p9 may be processed for analysis.

Figure 5H:
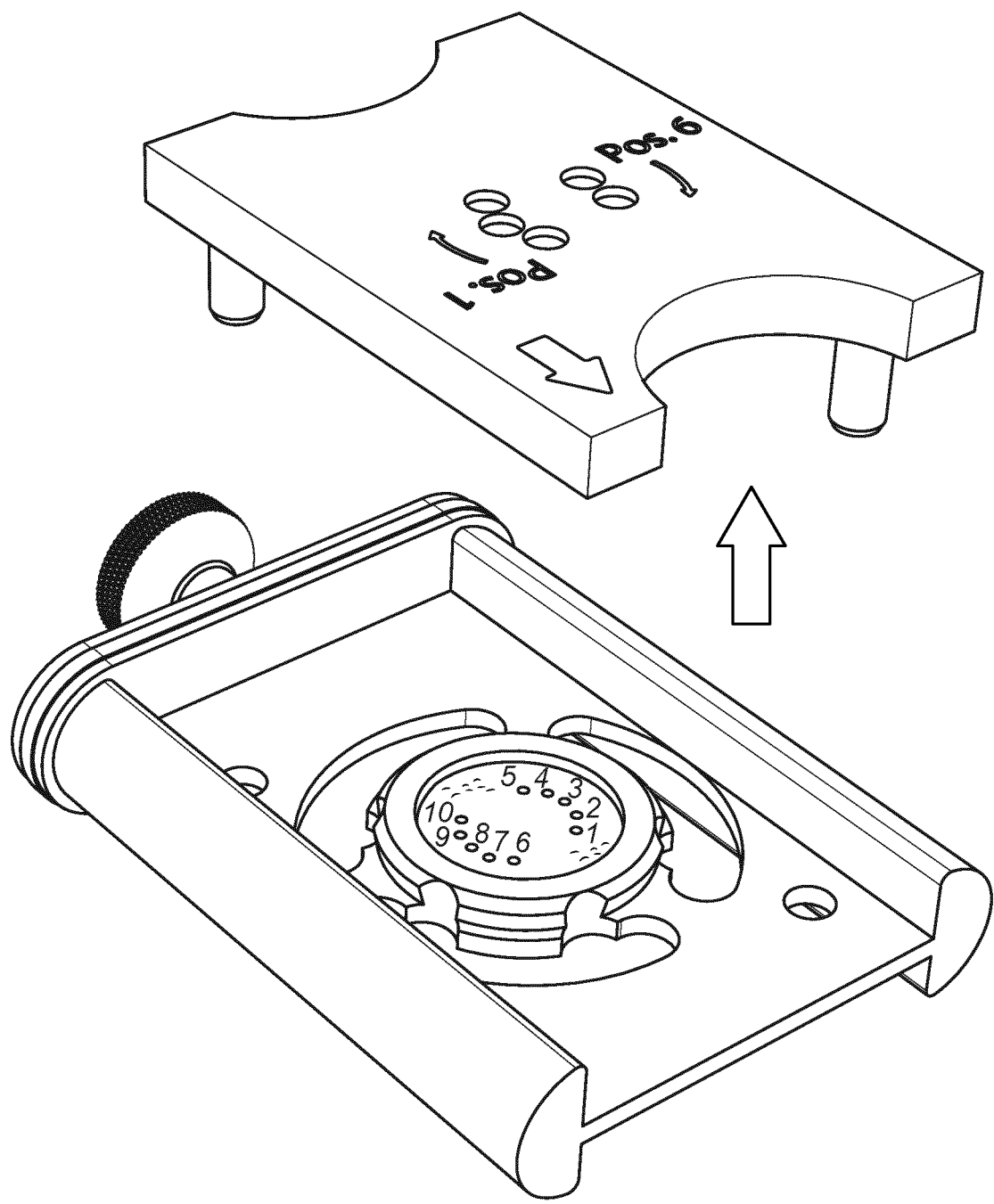

Thereafter, the guiding device 250 is turned 180° (see FIG. 5F) and connected to the holding device 210 in the second punching position Pos.6 (as described above and seen in FIG. 5G), and the remaining five samples containing piles of particles are collected as described above. When the guiding device is connected in the second punching position Pos.6, the remaining two piles p2 and p4 are collected from the first crescent-shaped group 222a, and the three remaining piles p6, p8 and p10 are collected from the second crescent-shaped group 222b (see FIG. 5H). Optionally, more than one, such as two, three, four, five, six, seven, eight, nine or ten punched-out samples may be collected inside the hollow sample collector 233 and thereafter dislodged collectively into the same test tube for subsequent analysis. Obviously, the order of connecting the guiding device 250 may be reversed, such that the piles p2, p4, p6, p8, and p10 are collected with the guiding device 250 in the second position Pos.6 before it is connected in the first position Pos.1 for collection of piles p.1, p.3, p.5, p.7 and p.9.

The advantageous design of the guiding device 250 enables precise collection of the piles of particles P by means of the punch cutter 230 despite the small size of the piles and the narrow space between the deposited piles. Due to the asymmetric placement of the guide bores 251a-e on the guiding device 250, there is provided ample room for the front end of the sample collector 233 to align with every second pile of particles P in each crescent-shaped group 222a, 222b when the guiding device 250 is connected in the first punching position Pos.1 and second punching position Pos.6 respectively.

Nearly the total area of each punched-out part from the collection plate 33, 43, 53 is covered by the collected pile of particles P. Only a small proportion of the collection plate 33, 43, 53 is not covered with particles. The advantage with obtaining punched-out parts totally covered by piles of particles P is that it requires much less washing solution to remove the particles P from the punched-out part than from the entire collection plate 33, 43, 53. The user may choose to analyze each punched-out part separately or to combine all punched-out parts from one collection plate 33, 43, 53 into one analysis. Either way the concentration of particles in the washing solution is increased several times compared to analysis of the entire collection plate 33, 43, 53.

EXAMPLE

Standard Method of Analysis Used in 2017

Exhaled particles were deposited onto a Millipore membrane in ten piles as described in WO 2009/045163 and WO 2019/011750. The Millipore membrane containing approximately 240 ng of exhaled particles was removed from the holding device and deposited into a test tube. About 120 µl of sample buffer was added to the test tube and biomolecules were extracted from the particles on the Millipore membrane. The sample buffer was separated from the Millipore membrane by centrifugation giving a final particle concentration corresponding to about 2 ng of particles/µl. Four samples (1 µl/sample) and one blank were analyzed using the Olink Target 96 Cardiometabolic assay which offers simultaneous analysis of 92 protein markers. A total of eight biomarkers from the Cardiometabolic panel were detected in at least one of four samples. (Limit of detection defined as 3 times the standard deviation from the mean Olink NPX signal measured from 3 blank samples).

The five biomarkers ICAM1, CDH1, CD46, CCL18 and TGFBI were detected in all four samples. Furthermore, FCGR2A was detected in three of the samples, MBL2 and GAS6 were detected in two of the samples and IGLC2 was detected in one of the four samples (see Table 1).

Method of Analysis Using the Sample Preparation Device of the Invention

Exhaled particles were deposited onto a Protein Saver 903 filter paper in ten piles as described in WO 2009/045163 and WO 2019/011750. Ten punched-out piles of particles (sub-samples) were collected from the Protein Saver 903 filter paper using the punch cutter and the guiding device as described herein. One of the punched-out sub-samples, containing one pile or approximately 20 ng of exhaled particles was deposited into a test tube and soaked in 1 µl sample buffer and thereafter analyzed using Olink protocol for dried blood spots. A concentration of 20 ng of exhaled particles/µl could be achieved. By using the sample preparation device as described herein, concentration of biomolecules in the Olink assay could been increased approximately 10 times. This improvement translates into a higher number of potential biomarkers that can be detected and measured in deposited piles of samples as follows. As can be seen in Table 1, fifty-nine sub samples (1 µl/sample) were analyzed using the Olink Target 96 Cardiometabolic assay, i.e., the same as for the standard method described above. Fifty-six of the biomarkers from the Cardiometabolic panel were detected in all fifty-nine samples. This should be compared to only five biomarkers being detected in four samples using the standard method.

The example of Olink assay, as described herein utilizes only one of 10 possible sub-samples. This illustrates how the new sample preparation device and method described herein can be utilized to generate significantly more precise biomarker data from exhaled particles trapped on a substrate by impaction technology. By pooling all punched sub-samples into one sample tube, biomolecules can be extracted from the entire content of the collected sample in only 20 µl of sample buffer, and thereby in principle make the method suitable for any other commercially available platform for biomarker discovery, still maximizing the utilization of the small number of biomolecules that can be captured from exhaled air.

TABLE 1

| Protein full name (Olink Cardiometabolic panel) | Official symbol | "240 ng" in 2020 (20 ng/µl) | 2020 % of 59 samples | "240 ng" in 2017 (2 ng/µl) | 2017 % of 4 samples | |
|---|---|---|---|---|---|---|
| C-C motif chemokine 18 | CCL18 | 59 | 100 | 4 | 100 | 1 |
| Membrane cofactor protein | CD46 | 59 | 100 | 4 | 100 | 2 |
| Cadherin-1 | CDH1 | 59 | 100 | 4 | 100 | 3 |
| Intercellular adhesion molecule 1 | ICAM1 | 59 | 100 | 4 | 100 | 4 |
| Neutrophil gelatinase-associated lipocalin | LCN2 | 59 | 100 | 4 | 100 | 5 |
| Transforming growth factor-beta-induced protein ig-h3 | TGFBI | 59 | 100 | 4 | 100 | 6 |
| Neuropilin-1 | NRP1 | 57 | 97 | 4 | 100 | 7 |
| Glutaminyl-peptide cyclotransferase | QPCT | 23 | 39 | 4 | 100 | 8 |
| Low affinity immunoglobulin gamma Fc region receptor II-a | FCGR2A | 59 | 100 | 3 | 75 | 9 |
| Growth arrest-specific protein 6 | GAS6 | 59 | 100 | 2 | 50 | 10 |
| Mannose-binding protein C | MBL2 | 59 | 100 | 2 | 50 | 11 |
| Ig lambda-2 chain C regions | IGLC2 | 59 | 100 | 1 | 25 | 12 |
| Complement C2 | C2 | 59 | 100 | 0 | 0 | 13 |
| Collagen alpha-1 XVIII chain | COL18A1 | 59 | 100 | 0 | 0 | 14 |
| Cartilage oligomeric matrix protein | COMP | 59 | 100 | 0 | 0 | 15 |
| Cystatin-C | CST3 | 59 | 100 | 0 | 0 | 16 |
| Dipeptidyl peptidase 4 | DPP4 | 59 | 100 | 0 | 0 | 17 |
| EGF-containing fibulin-like extracellular matrix protein 1 | EFEMP1 | 59 | 100 | 0 | 0 | 18 |
| Coagulation factor XI | F11 | 59 | 100 | 0 | 0 | 19 |
| Interleukin-7 receptor subunit alpha | IL7R | 59 | 100 | 0 | 0 | 20 |
| Leukocyte immunoglobulin-like receptor subfamily B member 1 | LILRB1 | 59 | 100 | 0 | 0 | 21 |
| Leukocyte immunoglobulin-like receptor subfamily B member 2 | LILRB2 | 59 | 100 | 0 | 0 | 22 |
| Hepatocyte growth factor receptor | MET | 59 | 100 | 0 | 0 | 23 |
| Oncostatin-M-specific receptor subunit beta | OSMR | 59 | 100 | 0 | 0 | 24 |
| Peptidyl-glycine alpha-amidating monooxygenase | PAM | 59 | 100 | 0 | 0 | 25 |
| Lithostathine-1-alpha | REG1A | 59 | 100 | 0 | 0 | 26 |
| L-selectin | SELL | 59 | 100 | 0 | 0 | 27 |
| Plasma serine protease inhibitor | SERPINA5 | 59 | 100 | 0 | 0 | 28 |
| Transcobalamin-2 | TCN2 | 59 | 100 | 0 | 0 | 29 |
| Metalloproteinase inhibitor 1 | TIMP1 | 59 | 100 | 0 | 0 | 30 |
| Tenascin | TNC | 59 | 100 | 0 | 0 | 31 |
| Low affinity immunoglobulin gamma Fc region receptor III-B | FCGR3B | 59 | 100 | 0 | 0 | 32 |
| Insulin-like growth factor-binding protein 6 | IGFBP6 | 59 | 100 | 0 | 0 | 33 |
| Integrin alpha-M | ITGAM | 59 | 100 | 0 | 0 | 34 |
| Lymphatic vessel endothelial hyaluronic acid receptor 1 | LYVE1 | 59 | 100 | 0 | 0 | 35 |
| Multiple epidermal growth factor-like domains protein 9 | MEGF9 | 59 | 100 | 0 | 0 | 36 |
| Neurogenic locus notch homolog protein 1 | NOTCH1 | 59 | 100 | 0 | 0 | 37 |
| Receptor-type tyrosine-protein phosphatase S | PTPRS | 59 | 100 | 0 | 0 | 38 |
| T-cell immunoglobulin and mucin domain-containing protein 4 | TIMD4 | 59 | 100 | 0 | 0 | 39 |
| C-C motif chemokine 14 | CCL14 | 59 | 100 | 0 | 0 | 40 |
| Complement factor H-related protein 5 | CFHR5 | 59 | 100 | 0 | 0 | 41 |
| Endoglin | ENG | 59 | 100 | 0 | 0 | 42 |
| Plexin-B2 | PLXNB2 | 59 | 100 | 0 | 0 | 43 |
| Insulin-like growth factor-binding protein 3 | IGFBP3 | 59 | 100 | 0 | 0 | 44 |
| Vitamin K-dependent protein C | PROC | 59 | 100 | 0 | 0 | 45 |
| Serum amyloid A-4 protein | SAA4 | 59 | 100 | 0 | 0 | 46 |
| Carbonic anhydrase 1 | CA1 | 59 | 100 | 0 | 0 | 47 |
| Liver carboxylesterase 1 | CES1 | 59 | 100 | 0 | 0 | 48 |
| Complement receptor type 2 | CR2 | 59 | 100 | 0 | 0 | 49 |
| Cartilage acidic protein 1 | CRTAC1 | 59 | 100 | 0 | 0 | 50 |
| Fetuin-B | FETUB | 59 | 100 | 0 | 0 | 51 |

TABLE 1-continued

| Protein full name (Olink Cardiometabolic panel) | Official symbol | "240 ng" in 2020 (20 ng/μl) | 2020 % of 59 samples | "240 ng" in 2017 (2 ng/μl) | 2017 % of 4 samples | |
|---|---|---|---|---|---|---|
| Platelet glycoprotein Ib alpha chain | GP1BA | 59 | 100 | 0 | 0 | 52 |
| Mast/stem cell growth factor receptor Kit | KIT | 59 | 100 | 0 | 0 | 53 |
| Procollagen C-endopeptidase enhancer 1 | PCOLCE | 59 | 100 | 0 | 0 | 54 |
| Thyroxine-binding globulin | SERPINA7 | 59 | 100 | 0 | 0 | 55 |
| SPARC-like protein 1 | SPARCL1 | 59 | 100 | 0 | 0 | 56 |
| Transforming growth factor beta receptor type 3 | TGFBR3 | 59 | 100 | 0 | 0 | 57 |
| Vascular cell adhesion protein 1 | VCAM1 | 59 | 100 | 0 | 0 | 58 |
| Apolipoprotein M | APOM | 58 | 99 | 0 | 0 | 59 |
| Membrane primary amine oxidase | AOC3 | 58 | 98 | 0 | 0 | 60 |
| Carbonic anhydrase 4 | CA4 | 57 | 97 | 0 | 0 | 61 |
| Leukocyte immunoglobulin-like receptor subfamily B member 5 | LILRB5 | 56 | 95 | 0 | 0 | 62 |
| Tyrosine-protein kinase receptor Tie-1 | TIE1 | 55 | 93 | 0 | 0 | 63 |
| Beta-galactoside alpha-2,6-sialyltransferase 1 | ST6GAL1 | 54 | 92 | 0 | 0 | 64 |
| Complement C1q tumor necrosis factor-related protein 1 | C1QTNF1 | 54 | 91 | 0 | 0 | 65 |
| Thrombospondin-4 | THBS4 | 54 | 91 | 0 | 0 | 66 |
| Vasorin | VASN | 52 | 88 | 0 | 0 | 67 |
| Carbonic anhydrase 3 | CA3 | 51 | 87 | 0 | 0 | 68 |
| Trypsin-2 | PRSS2 | 49 | 83 | 0 | 0 | 69 |
| Phospholipid transfer protein | PLTP | 45 | 77 | 0 | 0 | 70 |
| Intercellular adhesion molecule 3 | ICAM3 | 42 | 72 | 0 | 0 | 71 |
| Uromodulin | UMOD | 40 | 68 | 0 | 0 | 72 |
| CD59 glycoprotein | CD59 | 40 | 67 | 0 | 0 | 73 |
| Granulysin | GNLY | 39 | 66 | 0 | 0 | 74 |
| Angiogenin | ANG | 38 | 64 | 0 | 0 | 75 |
| Ficolin-2 | FCN2 | 34 | 58 | 0 | 0 | 76 |
| Beta-Ala-His dipeptidase | CNDP1 | 31 | 53 | 0 | 0 | 77 |
| Neural cell adhesion molecule 1 | NCAM1 | 31 | 52 | 0 | 0 | 78 |
| Angiopoietin-related protein 3 | ANGPTL3 | 30 | 50 | 0 | 0 | 79 |
| C-C motif chemokine 5 | CCL5 | 28 | 47 | 0 | 0 | 80 |
| Tenascin-X | TNXB | 18 | 30 | 0 | 0 | 81 |
| Microfibrillar-associated protein 5 | MFAP5 | 17 | 29 | 0 | 0 | 82 |
| Coagulation factor VII | F7 | 17 | 29 | 0 | 0 | 83 |
| Regenerating islet-derived protein 3-alpha | REG3A | 9 | 16 | 0 | 0 | 84 |
| Neutrophil defensin 1 | DEFA1 | 6 | 11 | 0 | 0 | 85 |
| Lysosomal Pro-X carboxypeptidase | PRCP | 6 | 10 | 0 | 0 | 86 |
| Platelet-activating factor acetylhydrolase | PLA2G7 | 5 | 9 | 0 | 0 | 87 |
| Latent-transforming growth factor beta-binding protein 2 | LTBP2 | 5 | 8 | 0 | 0 | 88 |
| Nidogen-1 | NID1 | 5 | 8 | 0 | 0 | 89 |
| Neural cell adhesion molecule L1-like protein | CHL1 | 1 | 2 | 0 | 0 | 90 |
| Superoxide dismutase [Cu—Zn] | SOD1 | 1 | 2 | 0 | 0 | 91 |
| Prolyl endopeptidase FAP | FAP | 0 | 0 | 0 | 0 | 92 |

The invention claimed is:

1. A sample preparation device for preparing a sample containing particles collected onto a collection plate, wherein said sample preparation device comprises a holding device for securing said collection plate; and a device for punch cutting provided with a sample collector; and a guiding device comprising two or more guide bores for receiving and guiding said sample collector, wherein the two or more guide bores for receiving and guiding said sample collector comprise a first plurality of guide bores and a second plurality of guide bores, and wherein the first and second pluralities of bores cooperate to define all bores through the guiding device, said guiding device extending a first length along a plane x between a first transverse side and a second transverse side; and a second length along a plane y, said plane y being perpendicular to said plane x; and a third length along a plane z, said plane z being perpendicular to both said planes x and said y, said third length defining a distance between a punch receiving side and a coupling side of said guiding device, said guiding device further comprising a centerline A extending parallel to said plane x dividing said guiding device into equally sized first half and second half, wherein said two or more guide bores are asymmetrically located relative to said centerline A in said first and/or second halves.

2. The sample preparation device according to claim 1, wherein said guiding device is configured to be connected to said holding device in either a first punching position (Pos.1) or a second punching position (Pos.6), wherein in the first punching position (Pos.1) said first transverse side faces in a first direction, and in the second punching position (Pos.6), said guiding device is turned 180° along said plane x and plane y, whereafter said first transverse side faces in a second direction, the second direction being directly opposite to said first direction.

3. The sample preparation device according to claim 2, wherein said collection plate is secured to said holding device by means of a magnetic locking ring.

4. The sample preparation device according to claim 1, wherein said sample collector is provided with a foremost first end defining a sharpened cutting edge.

5. The sample preparation device according to claim 1, wherein said sample collector is configured to be pushed through said collection plate during collection of said sample.

6. The sample preparation device according to claim 1, wherein said holding device comprises a first and a second receiving hole configured to receive a first and second guide pin provided on said coupling side of said guiding device.

7. The sample preparation device according to claim 6, wherein when said guiding device is connected to said holding device in in a first punching position (Pos.1), said first guide pin is received into said first receiving hole, and said second guide pin is received into said second receiving hole, and when said guiding device is connected to said holding device in a second punching position (Pos.6), said first guide pin is received into said second receiving hole, and said second guide pin is received into said first receiving hole.

8. The sample preparation device according to claim 1, wherein said two or more guide bores have a conical shape with an entrance diameter at the punch receiving side which is larger than an exit diameter at the coupling side.

9. The sample preparation device-according to claim 4, wherein said foremost first end of said sample collector has a conical shape configured to fit into each bore of said two or more guide bores provided in said guiding device.

10. The sample preparation device according to claim 1, wherein the guiding device is provided with three, four, five or more guide bores asymmetrically located relative to said centerline A in said first and/or second halves.

11. The sample preparation device according to claim 10, wherein the guiding device is provided with five guide bores asymmetrically located relative to said centerline A in said first and second halves.

12. The sample preparation device of claim 1, wherein:
the first plurality of bores are positioned on the first half, wherein the second plurality of bores are position on the second half, and
the first and second plurality of guide bores are asymmetrically located relative to said centerline A in said first and/or second halves so that, following rotation of the guiding device 180 degrees about an axis parallel to the plane z, positions of the second plurality of guide bores are offset from positions of the first plurality of guide bores prior to rotation of the guiding device.

13. The sample preparation device of claim 12, wherein the first plurality of bores and the second plurality of bores are arranged in a circle centered at the axis parallel to the plane z.

14. The sample preparation device of claim 12, wherein following rotation of the guiding device 180 degrees about the axis parallel to the plane z, a position of a first bore of the second plurality of guide bores is between positions of two bores of the first plurality of guide bores prior to rotation of the guiding device.

15. The sample preparation device of claim 14, wherein following rotation of the guiding device 180 degrees about the axis parallel to the plane z, the position of the first bore of the second plurality of guide bores is equally spaced between the positions of the two bores of the first plurality of guide bores prior to rotation of the guiding device.

* * * * *